(12) United States Patent
Kariyanahalli et al.

(10) Patent No.: US 10,798,071 B2
(45) Date of Patent: Oct. 6, 2020

(54) IPSEC ANTI-RELAY WINDOW WITH QUALITY OF SERVICE

(71) Applicant: Cisco Technology, Inc., San Jose, CA (US)

(72) Inventors: Praveen Raju Kariyanahalli, San Ramon, CA (US); Mosaddaq Hussain Turabi, San Jose, CA (US); Murtuza Attarwala, Davis, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 149 days.

(21) Appl. No.: 16/019,475

(22) Filed: Jun. 26, 2018

(65) Prior Publication Data

US 2019/0141019 A1 May 9, 2019

Related U.S. Application Data

(60) Provisional application No. 62/539,480, filed on Jul. 31, 2017.

(51) Int. Cl.
*H04L 29/06* (2006.01)

(52) U.S. Cl.
CPC ...... *H04L 63/0485* (2013.01); *H04L 63/0236* (2013.01); *H04L 63/0272* (2013.01); *H04L 63/108* (2013.01); *H04L 63/164* (2013.01); *H04L 63/20* (2013.01); *H04L 63/061* (2013.01); *H04L 63/1466* (2013.01)

(58) Field of Classification Search
CPC ............. H04L 63/0485; H04L 63/0272; H04L 63/108; H04L 63/164; H04L 63/0236; H04L 63/20; H04L 63/061; H04L 63/1466
See application file for complete search history.

(56) References Cited

U.S. PATENT DOCUMENTS

| 8,687,485 B1* | 4/2014 | Dondeti | H04L 63/0272 370/230 |
| 9,021,577 B2* | 4/2015 | Song | H04L 63/18 726/14 |
| 2010/0296395 A1* | 11/2010 | Fukuda | H04L 47/10 370/230 |

* cited by examiner

*Primary Examiner* — Matthew Smithers
(74) *Attorney, Agent, or Firm* — Polsinelli PC

(57) ABSTRACT

In some examples, an example method to provide an IPsec anti-replay window with quality of service (QoS) at a first network endpoint may include configuring a multiple number of anti-replay windows, generating a first security association (SA), and establishing the first SA with a second network endpoint. The first SA may include a first multiple number of security parameter indexes (SPIs), where each of the first multiple number of SPIs may be assigned to a specific QoS level, and each of the first multiple number of SPIs may be assigned to one of the multiple number of anti-replay windows. Establishing the first SA with the second network endpoint may include assigning the first SA to a first encryption key, and providing the first encryption key to the second network endpoint.

20 Claims, 6 Drawing Sheets

IPSEC ANTI-RELAY WINDOW WITH QUALITY OF SERVICE

CROSS REFERENCE TO RELATED APPLICATIONS

This application claims priority to U.S. Patent App. No. 62/539,480, filed Jul. 31, 2017, which is hereby incorporated by reference in its entirety.

FIELD

The present disclosure relates generally to network communications.

BACKGROUND

Internet protocol security (IPsec), as described in the Internet Engineering Task Force (IETF) Request for Comments (RFC) 4301, is a suite of protocols that provide for secure Internet Protocol (IP) communications. IPsec secures IP communications by authenticating and encrypting each IP packet of a communication session.

IPsec implements an anti-replay window to provide protection against replay attacks. A replay attack, also known as a playback attack, is a form of network attack in which an attacker records a valid data transmission and maliciously or fraudulently repeats or delays the data transmission in an attempt to subvert security. IPsec specifies the inclusion of a monotonically increasing sequence number in each IPsec packet. IPsec provides the use of an anti-replay window to keep track of which IPsec packets have already been processed on the bases of these sequence numbers.

An anti-replay window is a sliding window of the acceptable sequence numbers. An IPsec packet with a sequence number within the anti-replay window and which was not previously received (e.g., not a duplicate) is accepted. An IPsec packet with a sequence number within the anti-replay window and which was previously received (e.g., a duplicate) is dropped. An IPsec packet with a sequence number larger than the highest sequence number in the anti-replay window is accepted and marked as received. The anti-replay window is then moved to the right (e.g., the anti-replay window is moved to include the sequence number that is larger than the highest sequence number). An IPsec packet with a sequence number smaller than the lowest sequence number in the anti-replay window (e.g., a packet that is expected to have already been received) is dropped.

Unfortunately, the anti-replay window may not be as effective in providing the intended security if the IPsec packets are received out of sequence, as is likely when quality of service (QoS) is applied to the transmission of IPsec packets. For example, in providing the required QoS, a higher priority IPsec packet having a larger sequence number may be transmitted before lower priority IPsec packets having smaller sequence numbers. Upon receipt of the higher priority IPsec packet, the anti-replay window is moved to the right to include the larger sequence number. However, the newly positioned anti-replay window may preclude the acceptance of valid, lower priority IPsec packets having sequence numbers less than the lowest sequence number in the newly positioned anti-replay window.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to some examples, methods to provide Internet protocol security (IPsec) anti-replay window with quality of service (QoS) are described. An example method to provide an IPsec anti-replay window with QoS at a first network endpoint may include configuring a multiple number of anti-replay windows, generating a first security association (SA), and establishing the first SA with a second network endpoint. Each of the multiple number of anti-replay windows may include a left edge and a right edge, the left edge being a lowest sequence number and the right edge being a highest sequence number. The first SA may include a first multiple number of security parameter indexes (SPIs), where each of the first multiple number of SPIs may be assigned to a specific QoS level, and each of the first multiple number of SPIs may be assigned to one of the multiple number of anti-replay windows. Establishing the first SA with the second network endpoint may include assigning the first SA to a first encryption key, and providing the first encryption key to the second network endpoint.

The objects and advantages of the embodiments will be realized and achieved at least by the elements, features, and combinations particularly pointed out in the claims. Both the foregoing general description and the following detailed description are given as examples, are explanatory and are not restrictive of the invention, as claimed.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DESCRIPTION OF EMBODIMENTS

Figure 1:
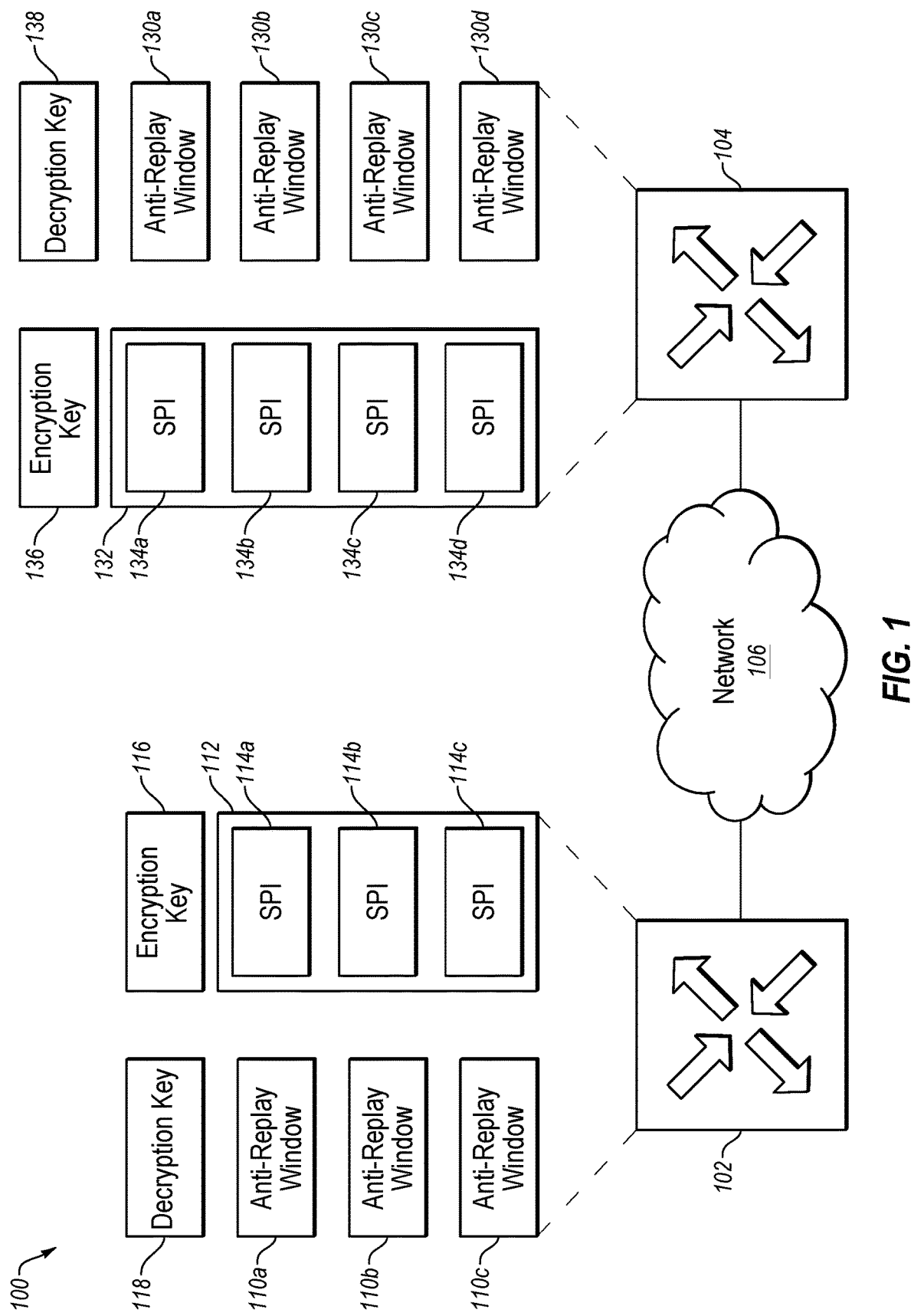
FIG. 1 illustrates an overview of an environment and devices in a first state on which some embodiments of the present disclosure may operate.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to providing an IPsec anti-replay window with quality of service (QoS).

As discussed above, IPsec is a protocol suite that includes security protocols for securing Internet Protocol (IP) communications across various networks, as discussed in Internet Engineering Task Force (IETF) document request for comment (RFC) 4301, which is incorporated herein by reference in its entirety. IPsec may be an end-to-end security scheme that protects data flows (e.g., communications) between two network endpoints, such as, by way of example, two routers. IPsec may employ a unidirectional Security Association (SA) pair to protect a data flow, including data packets, between two network endpoints. The SA may be assigned a shared secret of credentials, such as, by way of example, an encryption key and a decryption key pair, established between the two network endpoints. The SA may include a set of credentials and other security parameters that define an IPsec connection (also referred to as an IPsec tunnel).

For example, a first network endpoint may generate a first SA to protect communications with or to the first network endpoint, and a second network endpoint may generate a second SA to protect communications with or to the second network endpoint. The first SA may then be provided to the second network endpoint, and the second SA may be provided to the first network endpoint. The first network endpoint may then transmit IPsec packets to the second network endpoint using the second SA (e.g., an IPsec tunnel configured using the SA generated and provided by the second network endpoint), and the second network endpoint may transmit IPsec packets to the first network endpoint using the first SA (e.g., an IPsec tunnel configured using the SA generated and provided by the first network endpoint).

The present disclosure generally describes providing an SA that includes multiple security parameter indexes (SPIs). Each of the SPIs is associated with an independent anti-replay window. By assigning a QoS level, such as, by way of example, a priority level, etc., to each SPI and, as a result, to each independent anti-replay window associated with each SPI, the SA (e.g., a single SA) is able to support multiple QoS levels. In these and other embodiments, one or more fields of the IP header may be used to identify the QoS, including the source IP address, destination IP address, source port, destination port, protocol, DSCP/TOS, and/or others.

For example, a first network endpoint and a second network endpoint may exchange a shared secret, such as a public key and private key pair. The first network endpoint may generate a first SA that includes multiple SPIs, and assign the first SA to its public key. Accordingly, the first SA may be assigned the multiple SPIs. The first network endpoint may configure multiple anti-replay windows, and assign an independent anti-replay window to each SPI assigned to the first SA. In a similar manner, a second network endpoint may generate a second SA that includes multiple SPIs, and assign the second SA to its public key. The second network endpoint may configure multiple anti-replay windows, and assign an independent anti-replay window to each SPI assigned to the second SA. In some embodiments, the number of SPIs assigned to the first SA may be different than the number of SPIs assigned to the second SA.

The first SA may be provided to the second network endpoint, and the second SA may be provided to the first network endpoint, for example, to configure an IPsec tunnel between the first and second network endpoints. Having knowledge of the second SA and the public key assigned to the second SA, the first network endpoint is able to transmit IPsec packets of varying QoS levels to the second network endpoint. Likewise, having knowledge of the first SA and the public key assigned to the first SA, the second network endpoint is able to transmit IPsec packets of varying QoS levels to the first network endpoint.

For example, suppose the first SA includes three SPIs, one SPI assigned high priority, one SPI assigned mid priority, and one SPI assigned low priority. At the first network endpoint, the anti-replay window assigned to the high priority SPI is accordingly the high priority anti-replay window, the anti-replay window assigned to the mid priority SPI is accordingly the mid priority anti-replay window, and the anti-replay window assigned to the low priority SPI is accordingly the low priority anti-replay window. To send the first network endpoint a data packet as a high priority IPsec packet, the second network endpoint may encrypt the data packet using the public key assigned to the first SA, and attach a sequence number and the high priority SPI to the encrypted data packet. The first network endpoint may then determine that the IPsec packet is a high priority IPsec packet form the high priority SPI attached to the IPsec packet, and process the high priority IPsec packet based on the sequence number attached to the high priority IPsec packet and the high priority anti-replay window. The second network endpoint may also send IPsec packets of mid and low priority to the first network endpoint, and the first network endpoint may process the received mid and low priority IPsec packets in a similar manner. Accordingly, including multiple SPIs in an SA, with each SPI assigned an independent anti-replay window, allows a single SA to support multiple QoS levels while maintaining the effectiveness and intended benefits of the IPsec anti-replay window.

FIG. 1 illustrates an overview of an environment 100 and devices in a first state on which some embodiments of the present disclosure may operate, arranged in accordance with at least some embodiments described herein. Environment 100 may include a network endpoint 102 logically connected to a network endpoint 104 through a network 106. Network endpoints 102 and 104 may be network devices, such as, by way of example, routers, firewalls, and other network nodes, or network hosts, such as, by way of example, servers, clients, and other host nodes. Network 106 may be a local area network or a wide area network, the Internet, and/or other wired or wireless networks. The number of devices depicted in environment 100 is for illustration, and one skilled in the art will appreciate that there may be a different number of network endpoints 102 and 104.

For example, network endpoint 102 and network endpoint 104 may want to establish a pair of SAs that support quality of service (QoS) with each other to securely transfer data packets based on QoS. Network endpoint 102 may want to establish an SA with network endpoint 104 that supports three levels of QoS IPsec packet transmissions, a high QoS, a mid QoS, and a low QoS. Accordingly, network endpoint 102 may configure three independent anti-replay windows, an anti-replay window 110a, an anti-replay window 110b, and an anti-replay window 110c (collectively referred to as anti-replay windows 110). Each of anti-replay windows 110 may be configured as a sliding window of acceptable IPsec packet sequence numbers from a lowest sequence number (at the left edge of each window) to a highest sequence number (at the right edge of each window). Network endpoint 102 may designate anti-replay window 110a as the high QoS anti-replay window, anti-replay window 110b as the mid QoS anti-replay window, and anti-replay window 110c as the low QoS anti-replay window.

Network endpoint 102 may also generate an SA 112 that includes three security parameter indexes (SPIs), an SPI 114a, an SPI 114b, and an SPI 114c (collectively referred to as SPIs 114). Network endpoint 102 may designate SPI 114a as the high QoS SPI, SPI 114b as the mid QoS SPI, and SPI 114c as the low QoS SPI. These designations may result in SPI 114a being assigned to anti-replay window 110a, SPI 114b being assigned to anti-replay window 110b, and SPI 114c being assigned to anti-replay window 110c. Accordingly, network endpoint 102 may identify SPI packets that include SPI 114a as a high QoS IPsec packets and process the high QoS IPsec packets using anti-replay window 110a, identify SPI packets that include SPI 114b as mid QoS IPsec packets and process the mid QoS IPsec packets using anti-replay window 110b, and identify SPI packets that include SPI 114c as low QoS IPsec packets and process the low QoS IPsec packets using anti-replay window 110c.

Network endpoint 102 may obtain an encryption key 116 and a matching decryption key 118 to use in establishing the SA with network endpoint 104, and in transmitting IPsec packets through the SA. For example, encryption key 116 may be a public key, and encryption key 118 may be a corresponding private key.

Network endpoint 104 may want to establish an SA with network endpoint 104 that supports four levels of QoS IPsec packet transmissions, a high QoS, a mid-high QoS, a mid-low QoS, and a low QoS. Accordingly, network endpoint 104 may configure four independent anti-replay windows, an anti-replay window 130a, an anti-replay window 130b, an anti-replay window 130c, and an anti-replay window 130d (collectively referred to as anti-replay windows 130). Each of anti-replay windows 130 may be configured as a sliding window of acceptable IPsec packet sequence numbers from a lowest sequence number (at the left edge of each window) to a highest sequence number (at the right edge of each window). Network endpoint 104 may designate anti-replay window 130a as the high QoS anti-replay window, anti-replay window 130b as the mid-high QoS anti-replay window, anti-replay window 130c as the mid-low QoS anti-replay window, and anti-replay window 130d as the low QoS anti-replay window.

Network endpoint 104 may also generate an SA 132 that includes four security parameter indexes (SPIs), an SPI 134a, an SPI 134b, an SPI 134c, and an SPI 134d (collectively referred to as SPIs 134). Network endpoint 104 may designate SPI 134a as the high QoS SPI, SPI 134b as the mid-high QoS SPI, SPI 134c as the mid-low QoS SPI, and SPI 134d as the low QoS SPI. These designations may result in SPI 134a being assigned to anti-replay window 130a, SPI 134b being assigned to anti-replay window 130b, SPI 134c being assigned to anti-replay window 130c, and SPI 134d being assigned to anti-replay window 130d. Accordingly, network endpoint 104 may identify SPI packets that include SPI 134a as high QoS IPsec packets and process the high QoS IPsec packets using anti-replay window 130a, identify SPI packets that include SPI 134b as mid-high QoS IPsec packets and process the mid-high QoS IPsec packets using anti-replay window 130b, identify SPI packet that include SPI 134c as mid-low QoS IPsec packets and process the mid-low QoS IPsec packets using anti-replay window 130c, and identify SPI packets that include SPI 114d as low QoS IPsec packets and process the low QoS IPsec packets using anti-replay window 110d.

Network endpoint 104 may obtain an encryption key 136 and a matching decryption key 138 to use in establishing the SA 132 with network endpoint 104, and in transmitting IPsec packets through the SA 132. For example, encryption key 136 may be a public key, and encryption key 138 may be a corresponding private key.

Modifications, additions, or omissions may be made to FIG. 1 without departing from the scope of the present disclosure. For example, SA 112 and SA 132 may include a different number of SPIs, each SPI being assigned to an independent anti-replay window. In another example, SA 112 may be provided to one or more other network endpoints. Similarly, SA 132 may be provided to one or more other network endpoints.

Figure 2:
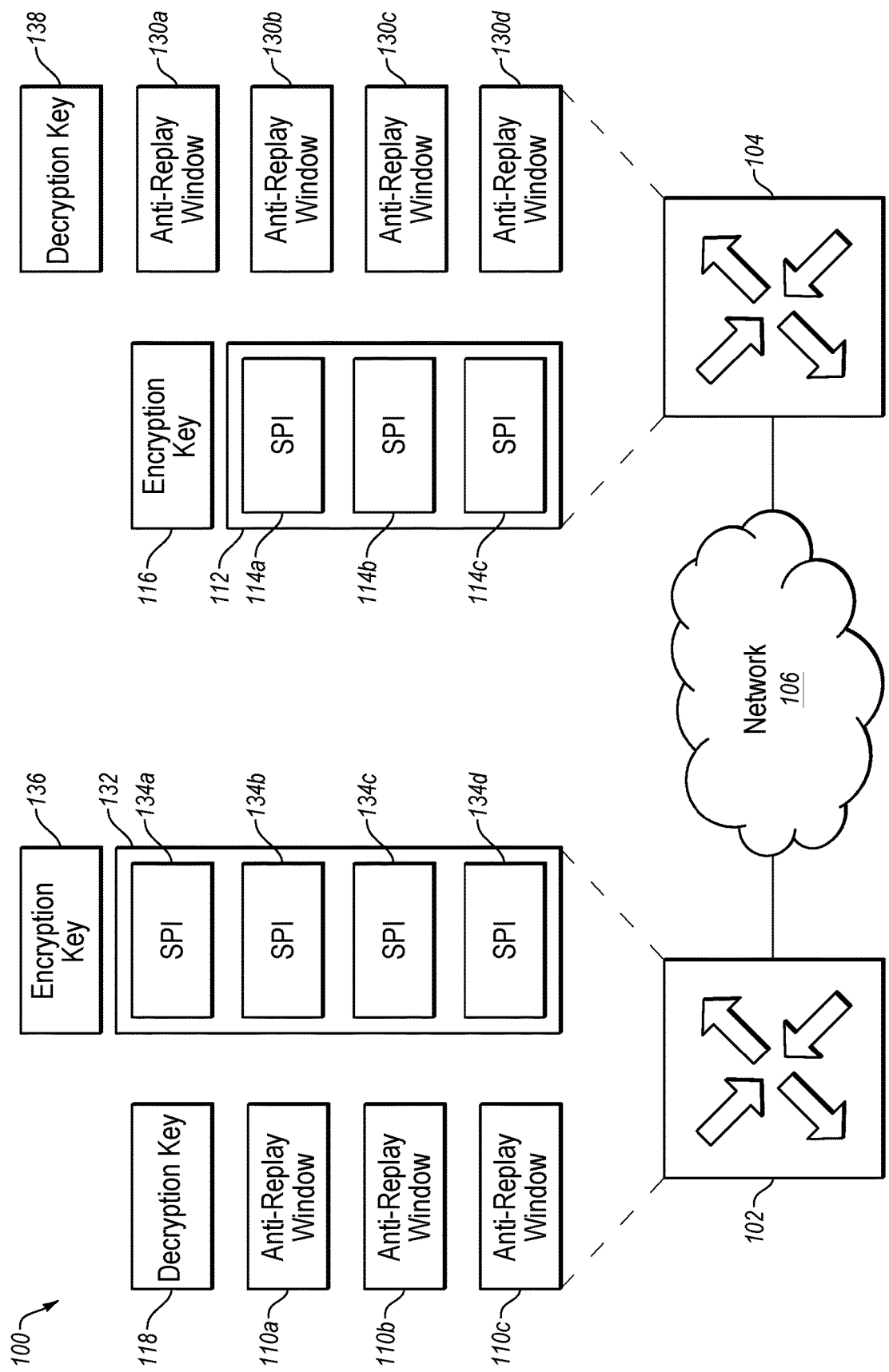
FIG. 2 illustrates an overview of the environment and devices in a second state on which some embodiments of the present disclosure may operate.

FIG. 2 illustrates an overview of environment 100 and devices in a second state on which some embodiments of the present disclosure may operate, arranged in accordance with at least some embodiments described herein. FIG. 2 illustrates environment 100 in the second state subsequent to the establishment of SAs 112 and 132 between network endpoint 102 and network endpoint 104. For example, network endpoint 102 may assign the key pair, encryption key 116 and decryption key 118 to SA 112, and use the assigned key pair to establish SA 112 with network endpoint 104. As a result, network endpoint 104 may receive and obtain knowledge of SA 112 (including SPIs 114) and encryption key 116 assigned to SA 112. Network endpoint 104 may then use SA 112 to send high QoS, mid QoS, and low QoS IPsec packets to network endpoint 102. Similarly, network endpoint 104 may assign the key pair, encryption key 136 and decryption key 138 to SA 132, and use the assigned key pair to establish SA 132 with network endpoint 102. As a result, network endpoint 102 may receive and obtain knowledge of SA 132 (including SPIs 134) and encryption key 136 assigned to SA 132. Network endpoint 102 may then use SA 132 to send high QoS, mid-high QoS, mid-low QoS, and low QoS IPsec packets to network endpoint 104.

For example, to send a first data packet to network endpoint 104 as a high QoS IPsec packet through SA 132, network endpoint 102 may encrypt the first data packet using encryption key 136, and encapsulate the encrypted first data packet to create a first IPsec packet. Network endpoint 102 may then attach a sequence number and SPI 134a to the first IPsec packet, and transmit the first IPsec packet to network endpoint 104. In some embodiments, the sequence number may be based on the QoS of the IPsec packet. For example, if this is the first high QoS IPsec packet being sent through SA 132, network endpoint 102 may assign the sequence number to 0. Network endpoint 102 may then increment the sequence number by 1 for each successive high QoS IPsec packet being sent through SA 132. For example, to send a second data packet (e.g., the next data packet following the first data packet) to network endpoint 104 as a high QoS IPsec packet through SA 132, network endpoint 102 may encrypt the second data packet using encryption key 136, and encapsulate the encrypted second data packet to create a second IPsec packet. Network endpoint 102 may then increment the sequence number from 0 to 1, attach the sequence number (e.g., sequence number 1)

and SPI 134*a* to the second IPsec packet, and transmit the second IPsec packet to network endpoint 104.

Continuing the above example, to send a third data packet (e.g., the next data packet following the second data packet) to network endpoint 104 as a mid-high QoS IPsec packet through SA 132, network endpoint 102 may encrypt the third data packet using encryption key 136, and encapsulate the encrypted third data packet to create a third IPsec packet. Network endpoint 102 may then attach a sequence number and SPI 134*a* to the third IPsec packet, and transmit the third IPsec packet to network endpoint 104. Network endpoint 102 may determine the sequence number based on the QoS of the IPsec packet. For example, assuming this is the first mid-high QoS IPsec packet being sent through SA 132, network endpoint 102 may assign the sequence number to 0. Network endpoint 102 may then increment the sequence number by 1 for each successive mid-high QoS IPsec packet being sent through SA 132. In a similar manner, network endpoint 102 may send mid-low QoS IPsec packets, low QoS IPsec packets, other high QoS IPsec packets, and/or other mid-high QoS IPsec packets through SA 132 to network endpoint 104.

At the other end of SA132, network endpoint 104 may receive the IPsec packets transmitted by network endpoint 102, and process the IPsec packets based on the SPI and sequence number attached to each IPsec packet, and the appropriate anti-replay window. Continuing the above example, network endpoint 104 may receive the first IPsec packet and, based on the attached SPI (e.g., SPI 134*a*), determine that the received IPsec packet is a high QoS IPsec packet. Network endpoint 104 may then process the received IPsec packet using anti-replay window 130*a* (e.g., the anti-replay window designated for processing of the high QoS IPsec packets).

Suppose anti-replay window 130*a* currently indicates an acceptable range of sequence numbers for high QoS IPsec packets from a lowest sequence number of 0 to a highest sequence number of 31. In this instance, network endpoint 104 may determine that the received IPsec packet includes a sequence number (e.g., sequence number 0) that is within anti-replay window 130*a* and is not a duplicate, and accept the received IPsec packet. Accordingly, network endpoint 104 may decrypt the accepted IPsec packet with decryption key 138 (e.g., the decryption key paired with encryption key 136 that was used to encrypt the IPsec packet), forward the decrypted IPsec packet to a next hop, and indicate the IPsec packet as received. For example, network endpoint 104 may maintain a record of IPsec packets that have been accepted and processed. In similar fashion, network endpoint 104 may receive and process the second IPsec packet using anti-replay window 130*a*, and receive and process the third IPsec packet using anti-replay window 130*b*.

Subsequently, anti-replay window 130*a* may be in a state that indicates an acceptable range of sequence numbers for high QoS IPsec packets from a lowest sequence number of 30 to a highest sequence number of 61. In this state, network endpoint 104 may drop a high QoS IPsec packet received through SA 132 that includes a sequence number that is smaller than 30 or includes a sequence number that is within anti-replay window 130*a* but is identified as having being already received. Network endpoint 104 may accept a high QoS IPsec packet received through SA 132 that includes a sequence number that is larger than 61 or includes a sequence number that is within anti-replay window 130*a* and is not identified as having being already received. If the accepted high QoS IPsec packet includes a sequence number that is larger than 61, network endpoint 104 may move or slide anti-replay 130*a* to the right to include the sequence number of the accepted high QoS IPsec packet. For example, assuming that the sequence number is 70, network endpoint 104 may move or slide anti-replay 130*a* to the right to include the sequence number 70 (e.g., move anti-replay window 130*a* to indicate an acceptable range of sequence numbers for high QoS IPsec packets from a lowest sequence number of 60 to a highest sequence number of 91).

In a similar manner, to send a first data packet to network endpoint 102 as a mid QoS IPsec packet through SA 112, network endpoint 104 may encrypt the first data packet using encryption key 116, and encapsulate the encrypted first data packet to create a first IPsec packet. Network endpoint 104 may then attach a sequence number and SPI 114*b* to the first IPsec packet, and transmit the first IPsec packet to network endpoint 102. Assuming this is the first mid QoS IPsec packet being sent through SA 112, network endpoint 104 may assign the sequence number to 0. Network endpoint 104 may then increment the sequence number by 1 for each successive mid QoS IPsec packet being sent through SA 112. Subsequently, to send a second data packet (e.g., the second data packet may be any data packet following the first data packet) to network endpoint 104 as a mid QoS IPsec packet through SA 112, network endpoint 104 may encrypt the second data packet using encryption key 116, and encapsulate the encrypted second data packet to create a second IPsec packet. Network endpoint 102 may then determine the next sequence number in the series of sequence numbers being used for mid QoS IPsec packets (e.g., increment the current sequence number by 1), attach the sequence number and SPI 114*b* to the second IPsec packet, and transmit the second IPsec packet to network endpoint 104.

Subsequently, to send a third data packet (e.g., the next data packet following the second data packet) to network endpoint 104 as a low QoS IPsec packet through SA 112, network endpoint 104 may encrypt the third data packet using encryption key 116, and encapsulate the encrypted third data packet to create a third IPsec packet. Network endpoint 104 may then attach a sequence number and SPI 114*c* to the third IPsec packet, and transmit the third IPsec packet to network endpoint 102. For example, assuming this is the twentieth low QoS IPsec packet being sent through SA 112, network endpoint 104 may assign the sequence number to 19 (e.g., the nineteenth low QoS IPsec packet may have included a sequence number of 18). In a similar manner, network endpoint 102 may send high QoS IPsec packets, other low QoS IPsec packets, and/or other mid QoS IPsec packets through SA 112 to network endpoint 104.

At the other end of SA 112, network endpoint 102 may receive the IPsec packets transmitted by network endpoint 104, and process the IPsec packets based on the SPI and sequence number attached to each IPsec packet, and the appropriate anti-replay window. Continuing the above example, network endpoint 102 may receive the first IPsec packet and, based on the attached SPI (e.g., SPI 114*b*), determine that the received IPsec packet is a mid QoS IPsec packet. Network endpoint 102 may then process the received IPsec packet using anti-replay window 110*b* (e.g., the anti-replay window designated for processing of the mid QoS IPsec packets).

Suppose anti-replay window 110*b* currently indicates an acceptable range of sequence numbers for mid QoS IPsec packets from a lowest sequence number of 0 to a highest sequence number of 63. In this instance, network endpoint 102 may determine that the received IPsec packet includes a sequence number (e.g., sequence number 0) that is within anti-replay window 110*b* and is not a duplicate, and accept the received IPsec packet. Accordingly, network endpoint 102 may decrypt the accepted IPsec packet with decryption key 118 (e.g., the decryption key paired with encryption key 116 that was used to encrypt the IPsec packet), forward the decrypted IPsec packet to a next hop, and indicate the IPsec packet as received. For example, network endpoint 102 may maintain a record of IPsec packets that have been accepted and processed. In similar fashion, network endpoint 102 may receive and process the second IPsec packet using anti-replay window 110*b*, and receive and process the third IPsec packet using anti-replay window 110*c*.

Subsequently, anti-replay window 110*b* may be in a state that indicates an acceptable range of sequence numbers for mid QoS IPsec packets from a lowest sequence number of 30 to a highest sequence number of 93. In this state, network endpoint 102 may drop a mid QoS IPsec packet received through SA 112 that includes a sequence number that is smaller than 30 or includes a sequence number that is within anti-replay window 110*b* but is identified as having being already received. Network endpoint 104 may accept a mid QoS IPsec packet received through SA 132 that includes a sequence number that is larger than 93 or includes a sequence number that is within anti-replay window 110*b* and is not identified as having being already received. If the accepted mid QoS IPsec packet includes a sequence number that is larger than 93, network endpoint 102 may move or slide anti-replay 110*b* to the right to include the sequence number of the accepted IPsec packet. For example, assuming that the sequence number is 100, network endpoint 102 may move or slide anti-replay 110*b* to the right to include the sequence number 100.

In some embodiments, the sequence numbers used for one QoS level may be independent of the sequence numbers used for the other QoS levels. That is, network endpoint 102 may determine the sequence numbers for high QoS IPsec packets without regard to the sequence numbers of the other QoS IPsec packets, determine the sequence numbers for mid-high QoS IPsec packets without regard to the sequence numbers of the other QoS IPsec packets, determine the sequence numbers for mid-low QoS IPsec packets without regard to the sequence numbers of the other QoS IPsec packets, and determine the sequence numbers for low QoS IPsec packets without regard to the sequence numbers of the other QoS IPsec packets.

Inclusion of multiple SPIs in a single SA, with each SPI assigned to a QoS, allows for the assignment of QoS to IPsec packets and the transmission of IPsec packets through the SA based on QoS. That is, a single SA (e.g., a single IPsec tunnel) is able to support QoS-based IPsec packet transmissions. Additionally, use of independent anti-replay windows to process the IPsec packets of varying QoS allows for the transmission and processing of IPsec packets of one QoS through the single SA without impact on the transmission and processing of IPsec packets of other QoS's. Moreover, maintaining reasonable anti-replay window sizes allows for the support of multiple QoS through a single SA in an efficient manner, e.g., without undue impact on memory usage, without impact on the intended benefits of anti-replay windows, and the like.

Figure 3:
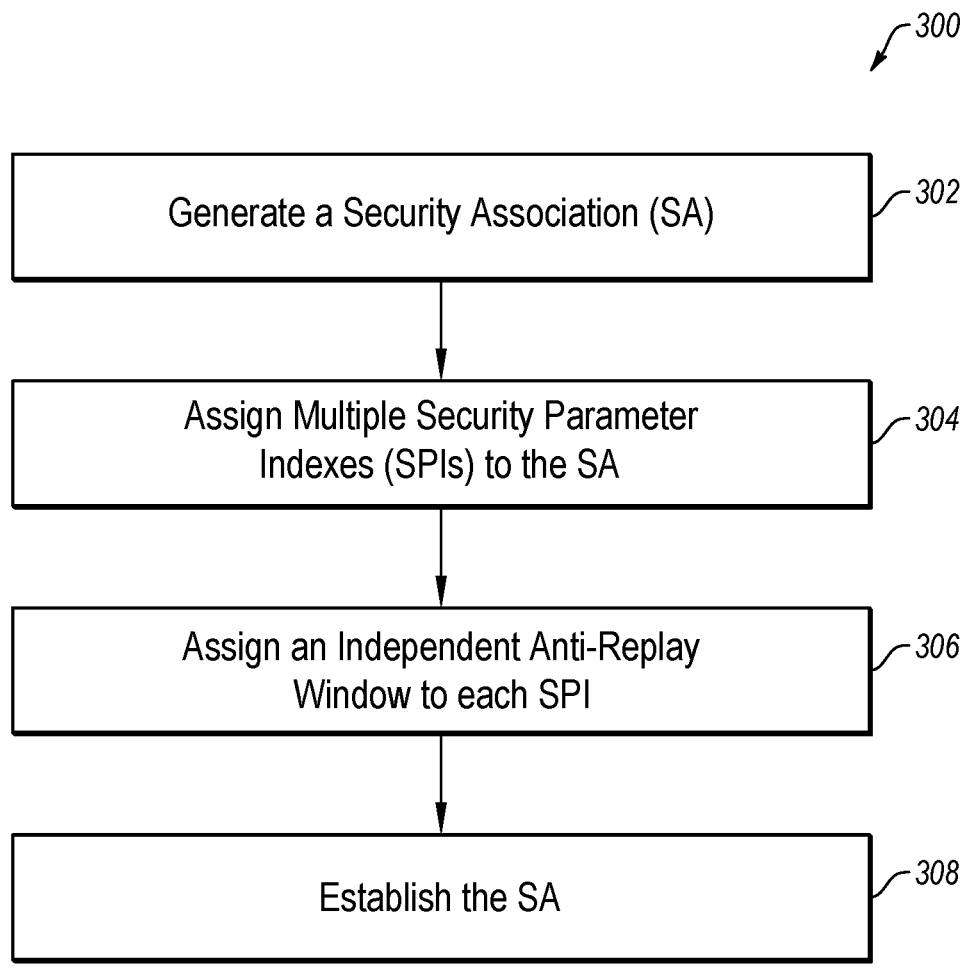
FIG. 3 is a flow diagram that illustrates an example process to establish an SA.

FIG. 3 is a flow diagram 300 that illustrates an example process to establish an SA, arranged in accordance with at least some embodiments described herein. Example processes and methods may include one or more operations, functions or actions as illustrated by one or more of blocks 302, 304, 306, and/or 308, and may in some embodiments be performed by a network endpoint such as an edge network device 602 of FIG. 6. The operations described in blocks 302-308 may also be stored as computer-executable instructions in a computer-readable medium such as a memory 614 and/or a data storage 616 of edge network device 602.

As depicted by flow diagram 300, the example process to establish an SA may begin with block 302 ("Generate a Security Association (SA)"), where a network endpoint, such as network endpoint 102, may generate a security association (SA).

Block 302 may be followed by block 304 ("Assign Multiple Security Parameter Indexes (SPIs) to the SA"), where the network endpoint may assign a multiple number of security parameter indexes (SPIs) to the SA. The network endpoint uses the SPI to select the SA with which a received IPsec packet is to be processed. Assigning multiple SPIs to the SA allows the receiving node to identify the SA using any one of the multiple SPIs assigned to the SA. That is, the SA includes the multiple SPIs that are assigned to it. Accordingly, by assigning each of the multiple number of SPIs to a quality of service (QoS), the network endpoint is able to provide a single SA that supports multiple QoS levels. For example, suppose the network endpoint wants to support eight QoS levels. In this instance, the network endpoint may assign SPIs 1, 2, 3, 4, 5, 6, 7, and 8 to the SA. Moreover, the network endpoint may designate SPI1 as the highest QoS level, and SPI8 as the lowest QoS level. In some embodiments, the SPI may be incremented by 1 for each subsequent SPI. For example, to assign four SPIs to the next SA, the network endpoint may assign SPIs 9, 10, 11, and 12 to the SA.

Block 304 may be followed by block 306 ("Assign an Independent Anti-Replay Window to each SPI"), where the network endpoint assigns an independent anti-replay window to each SPI that is assigned to the SA. For example, the network endpoint may create eight independent anti-replay windows ARW1, ARW2, ARW3, ARW4, ARW5, ARW6, ARW7, and ARW8, and assign ARW1 to SPI1, ARW2 to SPI2, ARW3 to SPI3, ARW4 to SPI4, ARW5 to SPI5, ARW6 to SPI6, ARW7 to SPI7, and ARW8 to SPI8. Assigning an independent anti-replay window to each SPI allows the network endpoint to process IPsec packets of differing QoS levels without impacting the processing of IPsec packets of other QoS levels. For example, the network endpoint may receive and accept a large number of IPsec packets of the highest QoS level, which may cause ARW1 to be moved to the right. The network endpoint may subsequently receive IPsec packets of the lowest QoS level. The network endpoint may use ARW8 to process the IPsec packets of the lowest QoS. Since the previously received IPsec packets of the highest QoS level were processed using ARW1 (e.g., an anti-replay window different than ARW8), previously processed IPsec packets of different QoS levels (e.g., QoS levels other than the lowest QoS level) do not impact the processing of the IPsec packets of the lowest QoS level.

Block 306 may be followed by block 308 ("Establish the SA"), where the network endpoint establishes the SA with another endpoint. As a result, the other endpoint obtains knowledge of the SA, including the encryption key for encrypting the IPsec packets to be sent through the SA. The other endpoint also obtains knowledge of the eight SPIs included in the SA and the QoS level assigned to each of the eight SPIs, allowing the other endpoint to send IPsec packets of any of the eight QoS levels to the network node. For example, to send an IPsec packet of the highest QoS level, the endpoint may attach SPI1 to the IPsec packet.

Those skilled in the art will appreciate that, for this and other processes and methods disclosed herein, the functions performed in the processes and methods may be implemented in differing order. Furthermore, the outlined actions and operations are only provided as examples, and some of the actions and operations may be optional, combined into fewer actions and operations, or expanded into additional actions and operations without detracting from the essence of the disclosed embodiments.

Figure 4:
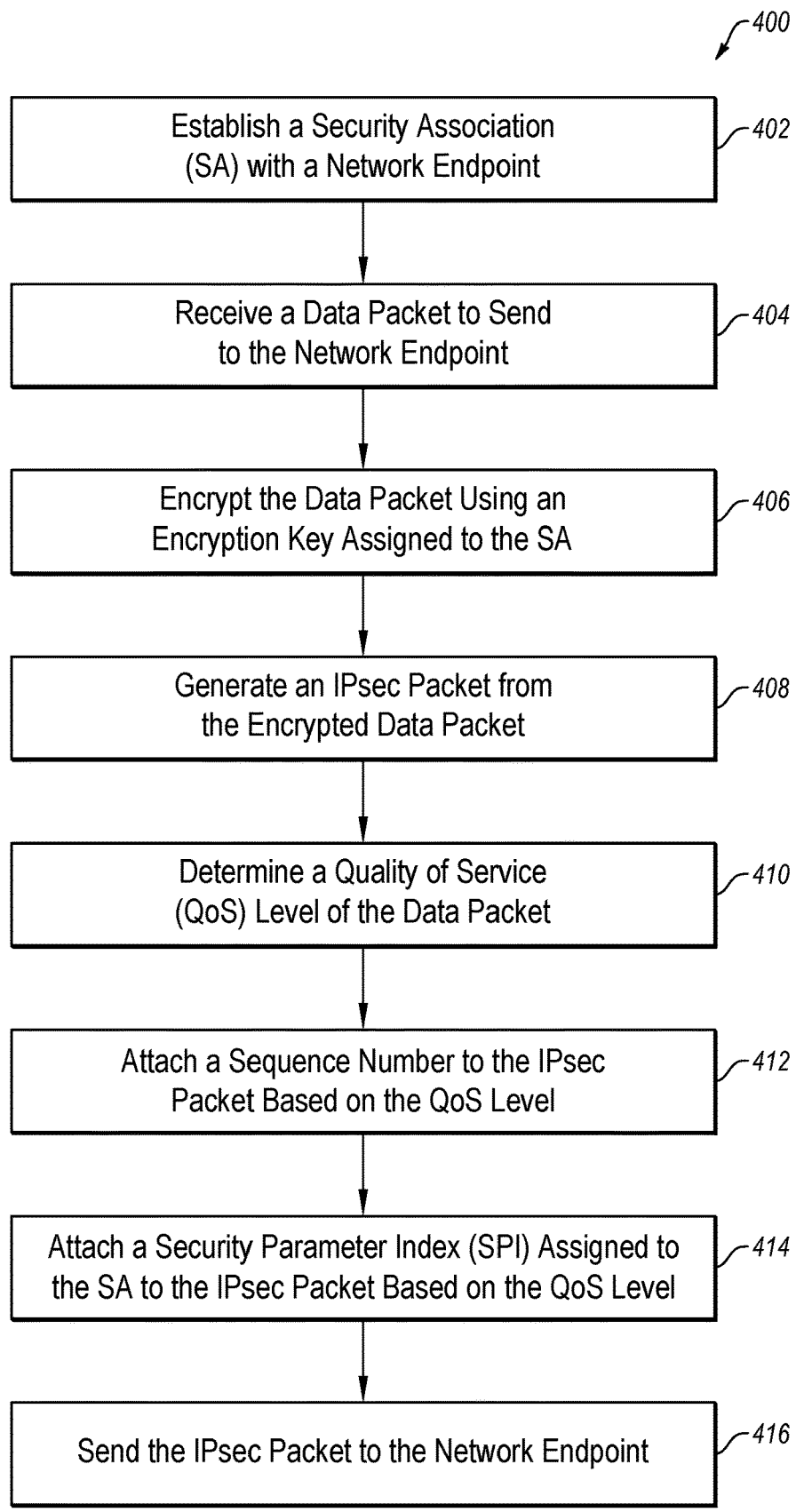
FIG. 4 is a flow diagram that illustrates an example process send an IPsec packet based on a QoS.

FIG. 4 is a flow diagram 400 that illustrates an example process send an IPsec packet based on a QoS, arranged in accordance with at least some embodiments described herein. Example processes and methods may include one or more operations, functions or actions as illustrated by one or more of blocks 402, 404, 406, 408, 410, 412, 414, and/or 416, and may in some embodiments be performed by a network endpoint such as edge network device 602 of FIG. 6. The operations described in blocks 402-416 may also be stored as computer-executable instructions in a computer-readable medium such as memory 614 and/or data storage 616 of edge network device 602.

As depicted by flow diagram 400, the example process to send an IPsec packet based on a QoS may begin with block 402 ("Establish a Security Association (SA) with a Network Endpoint"), where an endpoint may establish an SA with a network endpoint.

Block 402 may be followed by block 404 ("Receive a Data Packet to Send to the Network Endpoint"), where the endpoint may receive a data packet to send to the network endpoint.

Block 404 may be followed by block 406 ("Encrypt the Data Packet Using an Encryption Key Assigned to the SA"), where the endpoint may encrypt the data packet to send to the network endpoint using an encryption key assigned to the SA. The encryption key may include the network endpoint's public key, which the endpoint may have obtained as a result of establishing the SA with the network endpoint.

Block 406 may be followed by block 408 ("Generate an IPsec Packet from the Encrypted Data Packet"), where the endpoint may encapsulate the encrypted data packet to generate an IPsec packet.

Block 408 may be followed by block 410 ("Determine a Quality of Service (QoS) Level of the Data Packet"), where the endpoint may determine a QoS level for sending the data packet. Continuing the example above, the endpoint may determine that the data packet is to be sent to the network endpoint at the highest QoS level.

Block 410 may be followed by block 412 ("Attach a Sequence Number to the IPsec Packet based on the QoS Level"), where the endpoint attaches a sequence number to the IPsec packet. For example, the sequence number may be the sequence number of the immediately preceding highest QoS IPsec packet sent through the SA incremented by 1.

Block 412 may be followed by block 414 ("Attach a Security Parameter Index (SPI) Assigned to the SA to the IPsec Packet based on the QoS Level"), where the endpoint attaches an SPI to the IPsec packet based on the QoS level for sending the data packet. Continuing the example above, having determined that the data packet is to be sent to the network endpoint at the highest QoS level, the endpoint may attach SPI1 (the SPI that designates the highest QoS level) to the IPsec packet.

Block 414 may be followed by block 416 ("Send the IPsec Packet to the Network Endpoint"), where the endpoint may send the IPsec packet to the network endpoint. The IPsec packet includes SPI1, which indicates that the IPsec packet is a highest QoS IPsect packet.

Figure 5:
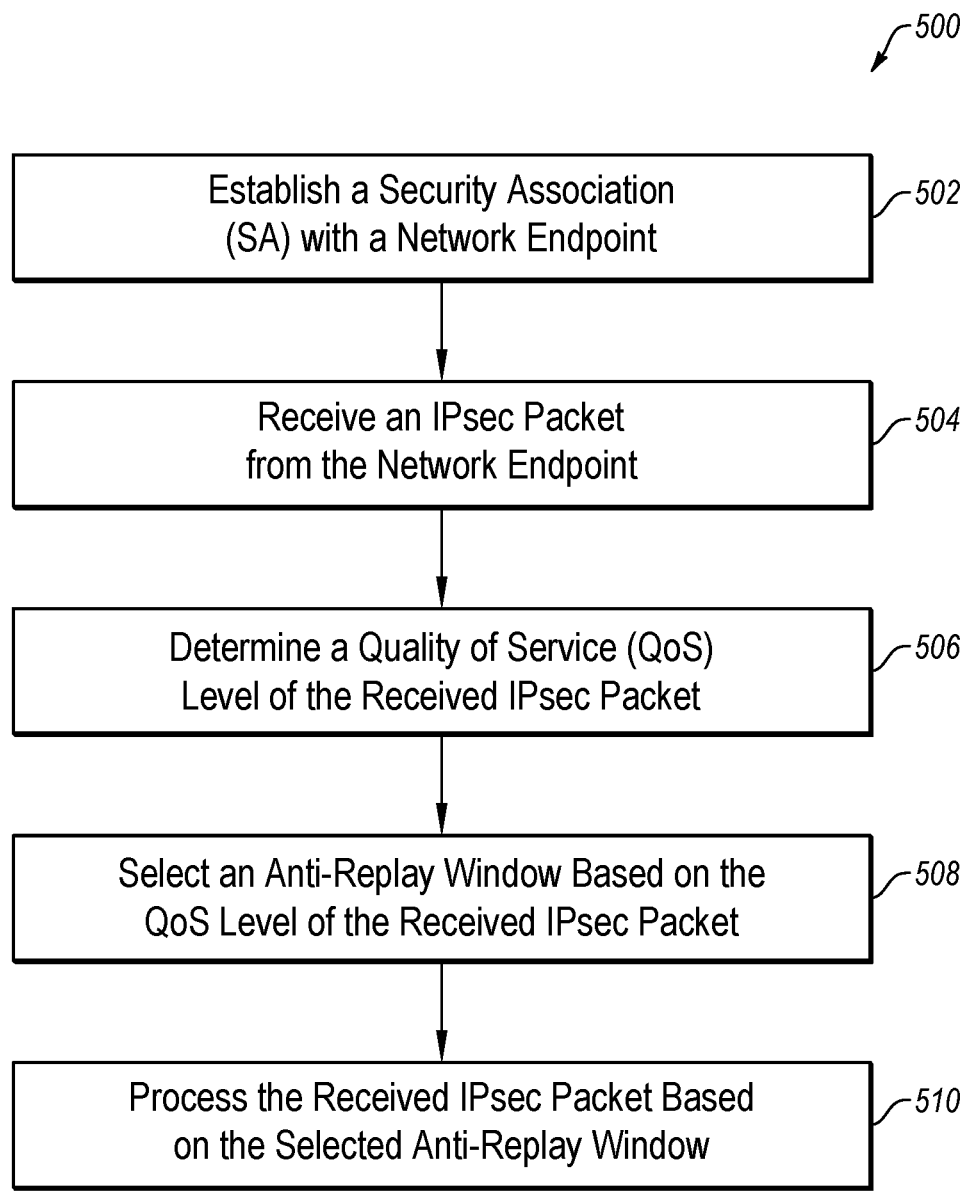
FIG. 5 is a flow diagram that illustrates an example process to process a received IPsec packet based on a QoS.

FIG. 5 is a flow diagram 500 that illustrates an example process to process a received IPsec packet based on a QoS, arranged in accordance with at least some embodiments described herein. Example processes and methods may include one or more operations, functions or actions as illustrated by one or more of blocks 502, 504, 506, 508, and/or 510, and may in some embodiments be performed by a network endpoint such as edge network device 602 of FIG. 6. The operations described in blocks 502-510 may also be stored as computer-executable instructions in a computer-readable medium such as memory 614 and/or data storage 616 of edge network device 602.

As depicted by flow diagram 500, the example process to process a received IPsec packet based on a QoS may begin with block 502 ("Establish a Security Association (SA) with a Network Endpoint"), where an endpoint may establish an SA with a network endpoint. For example, the SA may include SPI5, SPI6, and SPI7, where SPI5 designates high priority, SPI6 designates mid priority, and SPI7 designates low priority. Accordingly, to process IPsec packets of the three supported priorities, the endpoint may configure three independent anti-replay windows, one anti-replay window for each of the three priorities.

Block 502 may be followed by block 504 ("Receive an IPsec Packet from the Network Endpoint"), where the endpoint may receive an IPsec packet from the network endpoint. For example, the network endpoint may attach SPI6 to an IPsec packet, and send the IPsec packet to the endpoint as a mid priority IPsec packet.

Block 504 may be followed by block 506 ("Determine a Quality of Service (QoS) Level of the Received IPsec Packet"), where the endpoint may determine a QoS level of the received IPsec packet. The QoS level may be determined from the SPI attached to the IPsec packet. Continuing the example above, the endpoint may determine from the SPI attached to the received IPsec packet that the IPsec packet is a mid priority IPsec packet.

Block 506 may be followed by block 508 ("Select an Anti-Replay Window based on the QoS Level of the Received IPsec Packet"), where the endpoint may select an anti-replay window with which to process the received IPsec packet. The endpoint may select the anti-replay window based on the QoS level of the received IPsec packet. Continuing the example above, the endpoint may select the mid priority anti-replay window (e.g., the anti-replay window designated for processing mid priority IPsec packets).

Block 508 may be followed by block 510 ("Process the Received IPsec Packet based on the Selected Anti-Replay Window"), where the endpoint may process the received IPsec packet using the selected anti-replay window. Continuing the example above, the endpoint may process the mid priority IPsec packet using the mid priority anti-replay window.

Figure 6:
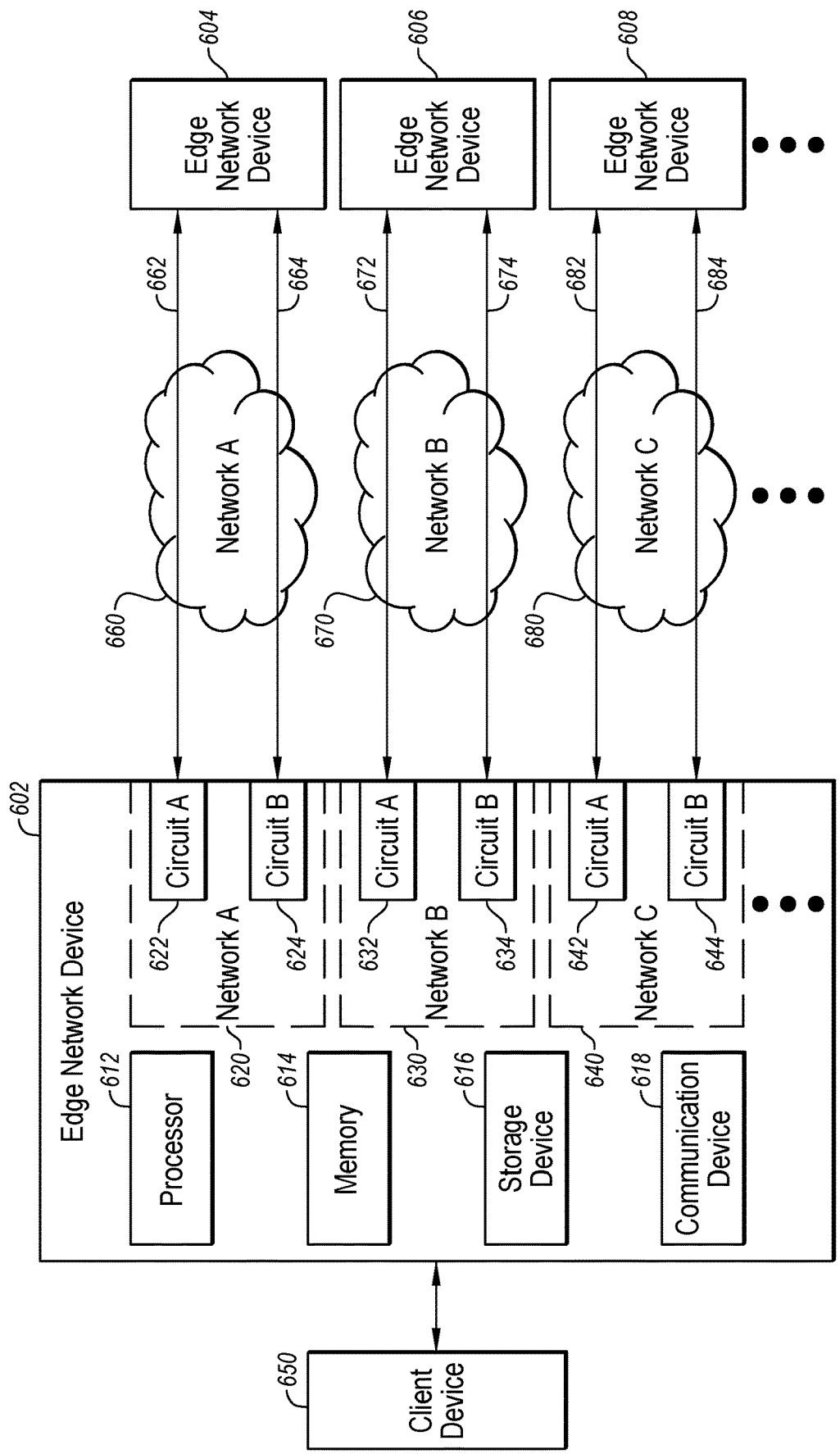
FIG. 6 illustrates an environment of an edge network device that may be used to provide an SA that includes a multiple number of security parameter indexes (SPIs), all arranged in accordance with at least some embodiments described herein.

FIG. 6 illustrates an environment 600 of edge network device 602 that may be used to provide an SA that includes a multiple number of security parameter indexes (SPIs), arranged in accordance with at least some embodiments described herein. As depicted, edge network device 602 that may include multiple potential connections for communicating with other edge network devices 604, 606, and 608. For example, edge network device 602 may communicate with edge network device 604 using a network A 660, with edge network device 606 using a network B 670, and/or with edge network device 608 using a network C 680. Edge network devices 602, 604, 606, and 608 may be similar or comparable to network endpoints 102 and 104 of FIG. 1 and FIG. 2. Environment 600 may additionally include a client device 650 that may be communicatively coupled to edge network device 602, for example, across an external network domain.

In some embodiments, edge network device 602 may include a network A connection 620, a network B connection 630, and a network C connection 640. As illustrated by the ellipses below network C connection 640, any number of additional or other potential connections may also be included. In these and other embodiments, edge network device 602 may include multiple circuits for connecting to the one or more potential connections. For example, edge network device 602 may include a circuit A 622 and a circuit B 624 for network A connection 620, a circuit A 632 and a circuit B 634 for network B connection 630, and a circuit A 642 and a circuit B 644 for network C connection 640. In these and other embodiments, edge network device 602 may be configured to route traffic along one or more of the circuits, based on one or more policies stored by edge network device 602.

In some embodiments, edge network device 602 may be configured to monitor one or more properties of the various connections. For example, edge network device 602 may monitor the jitter, latency, loss, and/or bandwidth of the various communication links from edge network device 602 to edge network device 604, 606, and/or 608. In these and other embodiments, edge network device 602 may also monitor and/or store security properties of the various communication links. For example, links 662 and 664 over network A 660 may be considered at a first level of security, links 672 and 674 over network B 670 may be considered at a second level of security, and links 682 and 684 over network C 680 may be considered at a third level of security. In some embodiments, one or more of links 662, 664, 672, 674, 682, and/or 684 may be tunnels, such as IPsec tunnels.

In some embodiments, edge network device 602 may route traffic intended for one or more applications to specific circuits based on one or more policies and/or based on one or more properties of the various connections. For example, a video application may be particularly susceptible to jitter. Edge network device 602 may determine that the video traffic may be travelling across link 682 with a jitter of 10 ms, and that link 662 may have a jitter of 4 ms. In this instance, edge network device 602 may shift the traffic for the video application to link 662 rather than link 682 because of the lower jitter. In some embodiments, shifting from link 682 to link 662 may be based on a jitter-based SLA. As another example, edge network device 602 may receive a data flow for a security-sensitive application (such as an accounting application) and may have a policy that data for that application is to be routed along one of network B links 672 and/or 674, even if other traffic may be routed along network A link 662. As a further example, edge network device 602 may include an SLA that a given application have a bandwidth of 10 MB/s available to the application. In this instance, edge network device 602 may make link 662 over network A 660 available to the application, but link 662 may provide 5 MB/s of bandwidth. Edge network device 602 may also provide links 682 and 684 to the application such that the overall combined bandwidth of links 662, 682, and 684 meet or exceed the bandwidth agreement of the SLA. In these and other embodiments, edge network device 602 may be configured to perform such routing based on initially receiving a data flow, during an on-going data flow, based on a triggering event of the data flow, and/or others or combinations thereof. Additionally or alternatively, such routing may combine multiple links of multiple types of connections for a single flow in routing traffic flows.

In some embodiments, edge network device 602 may be configured to route traffic to the various links based on the source of the traffic. For example, one or more policies may indicate that traffic from one corporate department of a business be routed along network B connection 630, while traffic for another corporate department may be routed along any link.

In some embodiments, edge network device 602 may include a processor 612, a memory 614, a storage device 616, and/or a communication device 618. Generally, processor 612 may include any suitable special-purpose or general-purpose computer, computing entity, or processing device including various computer hardware or software modules, and may be configured to execute instructions stored on any applicable computer-readable storage media. For example, processor 612 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 6, it is understood that processor 612 may include any number of processors distributed across any number of network or physical locations that are configured to perform individually or collectively any number of operations described in the present disclosure. In some embodiments, processor 612 may interpret and/or execute program instructions and/or process data stored in memory 614, storage device 616, or memory 614 and storage device 616. In some embodiments, processor 612 may fetch program instructions from data storage 616 and load the program instructions into memory 614. After the program instructions are loaded into memory 614, processor 612 may execute the program instructions.

Memory 614 and storage device 616 may include computer-readable storage media or one or more computer-readable storage mediums for carrying or having computer-executable instructions or data structures stored thereon. Such computer-readable storage media may be any available media that may be accessed by a general-purpose or special-purpose computer, such as processor 612. In some embodiments, edge network device 602 may or may not include either of memory 614 and storage device 616.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause processor 612 to perform a certain operation or group of operations.

Communication device 618 may include any component, device, system, or combination thereof that is configured to transmit or receive information. In some embodiments, communication device 618 may communicate with other devices at other locations, the same location, or even other components within the same system. For example, communication device 618 may include a modem, a network card (wireless or wired), an optical communication device, a radio frequency transducer, an ultrasonic transducer, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like, and/or combinations thereof. Communication device 618 may permit data to be exchanged with a network and/or any other devices or systems described in the present disclosure. For example, communication device 618 may allow edge network device 602 to communicate with other systems, such as any one or more of edge network devices 604, 606, and 608.

Modifications, additions, or omissions may be made to environment 600 of FIG. 6 without departing from the scope of the present disclosure. For example, while illustrated as including a certain number of edge network devices 602, 604, 606, and 608, environment 600 may include any number of edge network devices. As another example, while illustrated as including three communication networks (network A 660, network B 670, and network C 680) any number of communication networks may be utilized.

As indicated above, the embodiments described in the present disclosure may include the use of a special purpose or general purpose computer (e.g., processor 612 of FIG. 6) including various computer hardware or software modules, as discussed in greater detail herein. Further, as indicated above, embodiments described in the present disclosure may be implemented using computer-readable media (e.g., memory 614 of FIG. 6) for carrying or having computer-executable instructions or data structures stored thereon.

According to some examples, methods to provide an Internet protocol security (IPsec) anti-replay window with quality of service (QoS) are described. An example method to provide an IPsec anti-replay window with QoS at a first network endpoint may include configuring a multiple number of anti-replay windows, each of the multiple number of anti-replay windows including a left edge and a right edge, the left edge being a lowest sequence number and the right edge being a highest sequence number; generating a first security association (SA), the first SA including a first multiple number of security parameter indexes (SPIs), each of the first multiple number of SPIs being assigned to a specific QoS level, each of the first multiple number of SPIs being assigned to one of the multiple number of anti-replay windows; and establishing the first SA with a second network endpoint, wherein establishing the first SA with the second network endpoint includes assigning the first SA to a first encryption key, and providing the first encryption key to the second network endpoint.

According to some examples, the method may also include receiving an IPsec packet; determining a QoS level of the received IPsec packet, the QoS level being indicated by an SPI attached to the received IPsec packet; selecting one of the multiple number of anti-replay windows for the received IPsec packet, the selected one of the multiple number of anti-replay windows corresponding to the SPI attached to the received IPsec packet; and processing the received IPsec packet based on the selected one of the multiple number of anti-replay windows.

According to some examples, processing the IPsec packet based on the selected one of the multiple number of anti-replay windows includes dropping the IPsec packet responsive to a determination that a sequence number attached to the IPsec packet is smaller than the lowest sequence number of the selected one of the multiple number of anti-replay windows. According to other examples, processing the IPsec packet based on the selected one of the multiple number of anti-replay windows includes dropping the IPsec packet responsive to a determination that a sequence number attached to the IPsec packet is within the selected one of the multiple number of anti-replay windows and the IPsec packet is a duplicate IPsec packet.

According to still other examples, processing the IPsec packet based on the selected one of the plurality of anti-replay windows includes, responsive to a determination that a sequence number of the IPsec packet is within the selected one of the plurality of anti-replay windows and the IPsec packet is not a duplicate IPsec packet, decrypting the IPsec packet with a decryption key paired with the first encryption key; forwarding the decrypted IPsec packet to a next hop; and indicating the IPsec packet as being received. According to further examples, processing the IPsec packet based on the selected one of the multiple number of anti-replay windows includes, responsive to a determination that a sequence number of the IPsec packet is larger than the highest sequence number of the selected one of the multiple number of anti-replay windows, decrypting the IPsec packet with a decryption key paired with the first encryption key; forwarding the decrypted IPsec packet to a next hop; indicating the IPsec packet as being received; and moving the selected one of the multiple number of anti-replay windows to include the sequence number attached to the IPsec packet.

According to some examples, the method may also include generating a second SA, the second SA including a second multiple number of SPIs, each of the second multiple number of SPIs being different than each of the first multiple number of SPIs, each of the second multiple number of SPIs being assigned a specific QoS level, each of the second multiple number of SPIs being assigned one of the multiple number of anti-replay windows; and establishing the second SA with the second network endpoint, wherein establishing the second SA with the second network endpoint includes assigning the second SA to a second encryption key, and providing the second encryption key to the second network endpoint.

According to other examples, network endpoints configured to provide an Internet protocol security (IPsec) anti-replay window with quality of service (QoS) are described. An example first network endpoint configured to provide an IPsec anti-replay window with QoS may include a memory configured to store instructions and a processor configured to execute the instructions. Execution of the instructions may cause the processor to configure at least a first anti-replay window and a second anti-replay window, each of the anti-replay windows including a left edge and a right edge, the left edge being a lowest sequence number and the right edge being a highest sequence number; generate a first security association (SA), the first SA including a first security index (SPI) and a second SPI, the first SPI being assigned a first QoS level and the first anti-replay window, the second SPI being assigned a second QoS level and the second anti-replay window; and establish the first SA with a second network endpoint, wherein establish the first SA with the second network endpoint includes assignment of the first SA to a first encryption key, and provide the first encryption key to the second network endpoint.

According to some examples, execution of the instructions may cause the processor to receive an IPsec packet; determine a QoS level of the received IPsec packet, the QoS level being indicated by an SPI attached to the received IPsec packet; responsive to a determination that the QoS level of the received IPsec packet is the first QoS level, process the received IPsec packet based on the first anti-replay window; and responsive to a determination that the QoS level of the received IPsec packet is the second QoS level, process the received IPsec packet based on the second anti-replay window.

According to other examples, execution of the instructions may cause the processor to generate a second SA, the second SA being assigned a second encryption key, the second SA including a third SPI and a fourth SPI, the third SPI and the fourth SPI being associated with the second encryption key, the third SPI and the fourth SPI being different than the first SPI and the second SPI, the third SPI being assigned the first QoS level and the first anti-replay window, the fourth SPI being assigned the second QoS level and the second anti-replay window; and provide the second SA for use in configuring an IPsec tunnel with the network endpoint.

According to some examples, network endpoints configured to transmit IPsec packets to other network endpoints are described. An example first network endpoint configured to transmit an IPsec packet to a second network endpoint may include a memory configured to store instructions and a processor configured to execute the instructions. Execution of the instructions may cause the processor to encrypt a data packet using an encryption key assigned to an SA established with the second network endpoint, the SA being assigned to at least a first SPI and a second SPI included in the SA, the first SPI being assigned a first QoS level, the second SPI being assigned a second QoS level; generate an IPsec packet from the encrypted data packet; responsive to a determination that a QoS level for the data packet is the first QoS level, attach a first sequence number and the first SPI to the IPsec packet, the first sequence number being based on the first SPI; responsive to a determination that a QoS level for the data packet is the second QoS level, attach a second sequence number and the second SPI to the IPsec packet, the second sequence number being based on the second SPI; and transmit the IPsec packet to the second network endpoint.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method to provide an Internet protocol security (IPsec) anti-replay window with quality of service (QoS) at a first network endpoint, the method comprising:
  configuring a plurality of anti-replay windows, each of the plurality of anti-replay windows including a left edge and a right edge, the left edge being a lowest sequence number and the right edge being a highest sequence number;
  generating a first security association (SA), the first SA including a first plurality of security parameter indexes (SPIs), each of the first plurality of SPIs being assigned to a specific QoS level, each of the first plurality of SPIs being assigned to one of the plurality of anti-replay windows;
  establishing the first SA with a second network endpoint by assigning the first SA to a first encryption key and providing the first encryption key to the second network endpoint;
  generating a second SA; and
  establishing the second SA with the second network endpoint.

2. The method of claim 1, further comprising:
  receiving an IPsec packet;
  determining a QoS level of the IPsec packet, the QoS level being indicated by an SPI attached to the IPsec packet;

selecting one of the plurality of anti-replay windows for the IPsec packet, the selected one of the plurality of anti-replay windows corresponding to the SPI attached to the IPsec packet; and processing the IPsec packet based on the selected one of the plurality of anti-replay windows.

3. The method of claim 2, wherein the processing of the IPsec packet based on the one of the plurality of anti-replay windows includes dropping the IPsec packet responsive to a determination that a sequence number attached to the IPsec packet is smaller than the lowest sequence number of the one of the plurality of anti-replay windows.

4. The method of claim 2, wherein the processing of the IPsec packet based on the one of the plurality of anti-replay windows includes dropping the IPsec packet responsive to a determination that a sequence number attached to the IPsec packet is within the one of the plurality of anti-replay windows and the IPsec packet is a duplicate IPsec packet.

5. The method of claim 2, wherein the processing of the IPsec packet based on the one of the plurality of anti-replay windows includes, responsive to a determination that a sequence number of the IPsec packet is within the one of the plurality of anti-replay windows and the IPsec packet is not a duplicate IPsec packet:
  decrypting the IPsec packet with a decryption key paired with the first encryption key to yield a decrypted IPsec packet;
  forwarding the decrypted IPsec packet to a next hop; and
  indicating the IPsec packet as received.

6. The method of claim 2, wherein the processing of the IPsec packet based on the one of the plurality of anti-replay windows includes, responsive to a determination that a sequence number of the IPsec packet is larger than the highest sequence number of the one of the plurality of anti-replay windows:
  decrypting the IPsec packet with a decryption key paired with the first encryption key to yield a decrypted IPsec packet;
  forwarding the decrypted IPsec packet to a next hop;
  indicating the IPsec packet as received; and
  moving the one of the plurality of anti-replay windows to include the sequence number attached to the IPsec packet.

7. The method of claim 1,
  wherein,
    the second SA includes a second plurality of SPIs,
    each of the second plurality of SPIs is different than each of the first plurality of SPIs,
    each of the second plurality of SPIs is assigned a specific QoS level,
    each of the second plurality of SPIs is assigned one of the plurality of anti-replay windows, and
    the establishing of the second SA includes assigning the second SA to a second encryption key and providing the second encryption key to the second network endpoint.

8. A first network endpoint configured to provide an Internet protocol security (IPsec) anti-replay window with quality of service (QoS), the first network endpoint comprising:
  a memory configured to store instructions; and
  a processor configured to execute the instructions and cause the processor to:
    configure at least a first anti-replay window and a second anti-replay window, each of the first anti-replay window and the second anti-replay window including a left edge and a right edge, the left edge being a lowest sequence number and the right edge being a highest sequence number;
    generate a first security association (SA), the first SA including a first security index (SPI) and a second SPI, the first SPI being assigned a first QoS level and the first anti-replay window, the second SRI being assigned a second QoS level and the second anti-replay window;
    establish the first SA with a second network endpoint by assigning the first SA to a first encryption key and providing the first encryption key to the second network endpoint;
    generate a second SA; and
    establish the second SA with the second network endpoint.

9. The first network endpoint of claim 8, wherein execution of the instructions causes the processor to:
  receive an IPsec packet;
  determine a QoS level of the IPsec packet, the QoS level being indicated by an SRI attached to the IPsec packet;
  responsive to a determination that the QoS level of the IPsec packet is the first QoS level, process the IPsec packet based on the first anti-replay window; and
  responsive to a determination that the QoS level of the IPsec packet is the second QoS level, process the IPsec packet based on the second anti-replay window.

10. The first network endpoint of claim 9, wherein processing the IPsec packet based on the first anti-replay window causes the processor to drop the IPsec packet responsive to a determination that a sequence number attached to the IPsec packet is smaller than the lowest sequence number of the first anti-replay window.

11. The first network endpoint of claim 9, wherein processing the IPsec packet based on the first anti-replay window causes the processor to drop the IPsec packet responsive to a determination that a sequence number attached to the IPsec packet is within the first anti-replay window and the IPsec packet is a duplicate IPsec packet.

12. The first network endpoint of claim 9, wherein processing the IPsec packet based on the first anti-replay window causes the processor to, responsive to a determination that a sequence number of the IPsec packet is within the first anti-replay window and the IPsec packet is not a duplicate IPsec packet:
  decrypt the IPsec packet with a decryption key paired with the first encryption key to yield a decrypted IPsec packet;
  forward the decrypted IPsec packet to a next hop; and
  indicate the IPsec packet as received.

13. The first network endpoint of claim 9, wherein processing the IPsec packet based on the first anti-replay window causes the processor to, responsive to a determination that a sequence number of the IPsec packet is larger than the highest sequence number of the first anti-replay window:
  decrypt the IPsec packet with a decryption key paired with the first encryption key to yield a decrypted IPsec packet;
  forward the decrypted IPsec packet to a next hop;
  indicate the IPsec packet as received; and
  move the first anti-replay window to include the sequence number attached to the IPsec packet.

14. The first network endpoint of claim 9, wherein processing the IPsec packet based on the second anti-replay window causes the processor to drop the IPsec packet responsive to a determination that a sequence number attached to the IPsec packet is smaller than the lowest sequence number of the second anti-replay window.

15. The first network endpoint of claim 9, wherein processing the IPsec packet based on the second anti-replay window causes the processor to drop the IPsec packet responsive to a determination that a sequence number attached to the IPsec packet is within the second anti-replay window and the IPsec packet is a duplicate IPsec packet.

16. The first network endpoint of claim 9, wherein processing the IPsec packet based on the second anti-replay window causes the processor to, responsive to a determination that a sequence number of the IPsec packet is within the second anti-replay window and the IPsec packet is not a duplicate IPsec packet:
  decrypt the IPsec packet with a decryption key paired with the first encryption key to yield a decrypted IPsec packet;
  forward the decrypted IPsec packet to a next hop; and
  indicate the IPsec packet as received.

17. The first network endpoint of claim 9, wherein processing the IPsec packet based on the second anti-replay window causes the processor to, responsive to a determination that a sequence number of the IPsec packet is larger than the highest sequence number of the second anti-replay window:
  decrypt the IPsec packet with a decryption key paired with the first encryption key to yield a decrypted IPsec packet;
  forward the decrypted IPsec packet to a next hop;
  indicate the IPsec packet as received; and
  move the second anti-replay window to include the sequence number attached to the IPsec packet.

18. The first network endpoint of claim 8,
wherein,
  the second SA is assigned a second encryption key,
  the second SA includes a third SPI and a fourth SPI,
  the third SPI and the fourth SPI are associated with the second encryption key,
  the third SPI and the fourth SPI are different than the first SPI and the second SPI,
  the third SPI is assigned the first QoS level and the first anti-replay window,
  the fourth SPI is assigned the second QoS level and the second anti-replay window, and
  execution of the instructions causes the processor to provide the second SA for use in configuring an IPsec tunnel with the first network endpoint.

19. A first network endpoint configured to transmit an IPsec packet to a second network endpoint, the first network endpoint comprising:
  a memory configured to store instructions; and
  a processor configured to execute the instructions and cause the processor to:
    encrypt a data packet using an encryption key assigned to an SA established with the second network endpoint to yield an encrypted data packet, the SA being assigned to at least a first SPI and a second SPI included in the SA, the first SPI being assigned a first QoS level, the second SPI being assigned a second QoS level;
    generate an IPsec packet from the encrypted data packet;
    responsive to a determination that a QoS level for the data packet is the first QoS level, attach a first sequence number and the first SPI to the IPsec packet, the first sequence number being based on the first SPI;
    responsive to a determination that a QoS level for the data packet is the second QoS level, attach a second sequence number and the second SPI to the IPsec packet, the second sequence number being based on the second SPI;
    transmit the IPsec packet to the second network endpoint;
    generate a second SA; and
    establish the second SA with the second network endpoint.

20. The first network endpoint of claim 19,
wherein,
  the second SA is assigned a second encryption key,
  the second SA includes a third SRI and a fourth SRI,
  the third SRI and the fourth SRI are associated with the second encryption key,
  the third SRI and the fourth SRI are different than the first SRI and the second SRI,
  the third SRI is assigned the first QoS level and the first anti-replay window,
  the fourth SRI is assigned the second QoS level and the second anti-replay window, and
  execution of the instructions causes the processor to provide the second SA for use in configuring an IPsec tunnel with the first network endpoint.

* * * * *